R. REEDER.

Mariners' Time Compass.

No. 4,964.

2 Sheets—Sheet 1.

Patented Feb. 9, 1847.

R. REEDER.

Mariners' Time Compass.

No. 4,964.

2 Sheets—Sheet 2.

Patented Feb. 9, 1847.

UNITED STATES PATENT OFFICE.

RALPH REEDER, OF CINCINNATI, OHIO.

MARINER'S TIME-COMPASS.

Specification of Letters Patent No. 4,964, dated February 9, 1847.

*To all whom it may concern:*

Be it known that I, RALPH REEDER, of the city of Cincinnati, in the county of Hamilton and State of Ohio, have invented a new and useful Manner of Constructing Instruments to be Used in Navigation and Surveying and for other Purposes; and I do hereby declare that the following is a full and exact description thereof.

This instrument I have denominated the "chrono pyxis nautica" or "Mariner's time compass," its intention being to obviate the defects of the magnetic needle either at sea or on land, where it traverses badly or not at all, as it may be used without the aid of such a needle, and will enable the observer to find the latitude of the place at anytime of the day, and also the meridian time of such place; which elements are easily converted into longitude. These effects are dependent mainly upon the manner in which I have combined a chronometer and an universal sun dial with the graduated circles and arcs duly arranged for the purpose and which constitute the main body of the instrument; which combination and arrangement I will now proceed to describe by the aid of the accompanying drawings which make a part of this specification.

Figure 1:
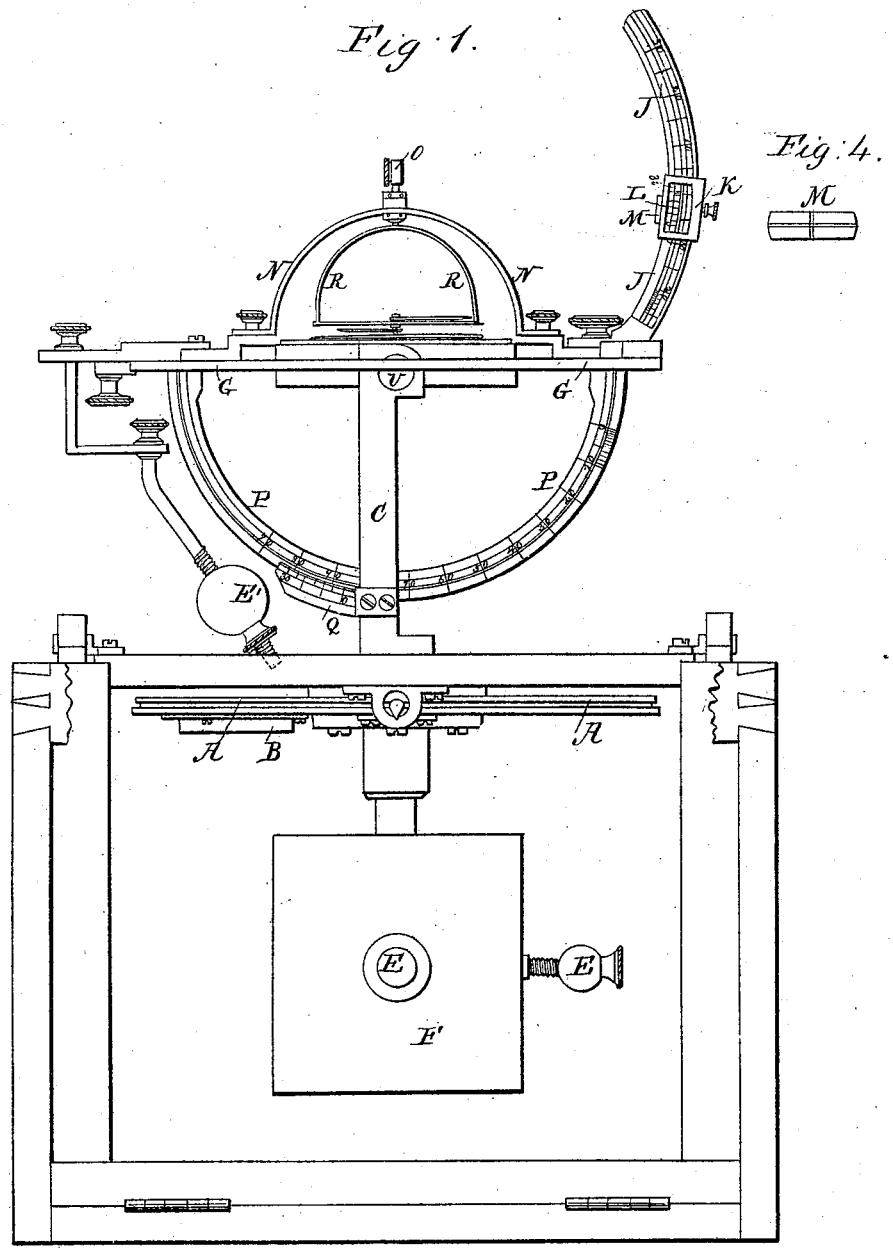
Figure 2:
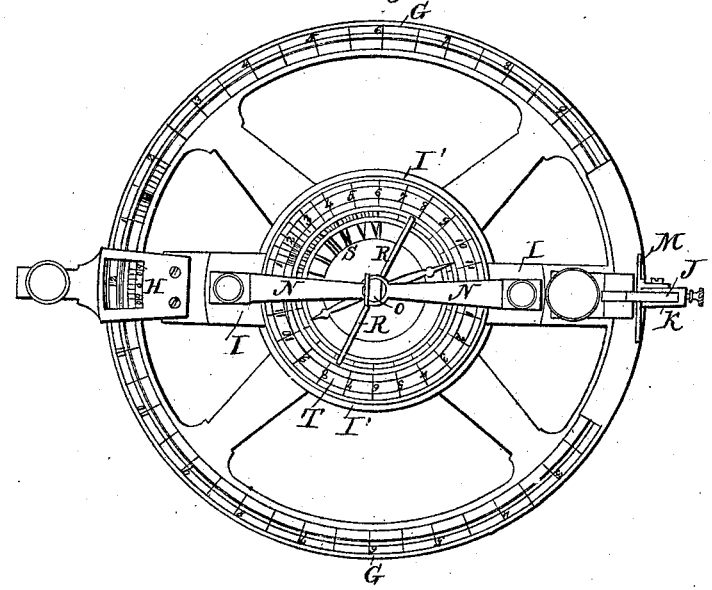
Figure 3:
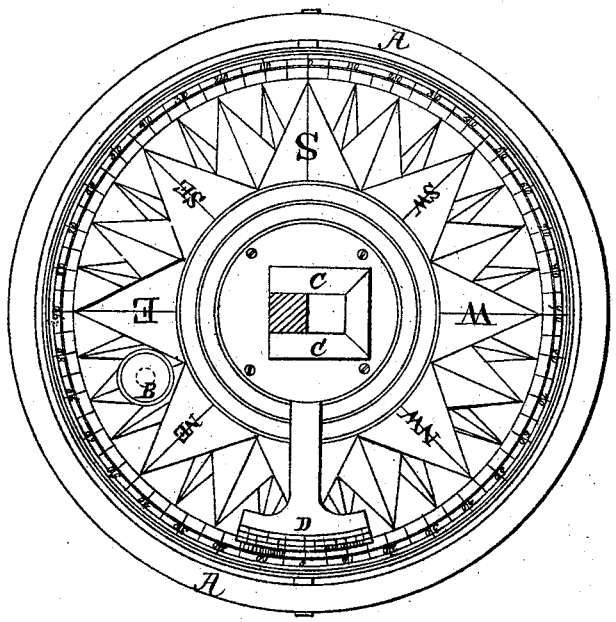

In the drawings referred to, Figure 1 is an elevation of the instrument which is suspended on gimbals in the ordinary manner of suspending the mariners compass. Fig. 2 is a top view of the upper plate or circle of the instrument showing the face of the chromometer; the manner of graduating its surrounding circle and of adjusting the parts to each other. Fig. 3 is a top view of the lower plate, having on it the cardinal points with a circle divided into 360 degrees, and a nonius for adjusting the upper circle thereto.

In each of these figures where like parts occur they are designated by the same letters of reference.

A is the lower plate containing the cardinal points and graduated into degrees and minutes. This is furnished with a spirit level as shown at B Fig. 3. From the center of this plate rises the standard C, that sustains the upper portion of the instrument which standard revolves on said plate as a center. The standard C carries a nonius D which rests on the lower plate A, by means of which the instrument may be accurately set to the known course of a vessel.

The instrument may be accurately leveled by means of the adjusting weights E E E, three of which may be attached to the main counterpoise F, and one to the upper part of the instrument as seen at E' Fig. 1; or in other modes that will produce a like effect.

G, Figs. 1 and 2 is the upper, or hour circle, or plate, the outer rim of which is divided into twice twelve, or twenty-four hours, and into minutes. At nonius H on one of the arms I, I, attached to a rim I' moves round on this circle, the opposite arm carrying the declination arc or segment J, which is made fast thereto. Upon this segment there is a slide K which is furnished with a nonius index L by means of which it may be accurately set to any desired degree of declination said degrees being laid off on the arc or segment J. The slide K carries a plate M, the face of which is shown in Fig. 4; and the brass arch N that is attached to the arms I, I, sustains a small lens at O, the focal length of which is equal to the distance between it and the face of the plate M. This plate is shown as having horizontal lines drawn on it, leaving a small square at their intersection, designating the point on which the focus of the lens should fall, when the instrument is adjusted. When this instrument is to be used at sea, I draw other lines parallel to, and outside of, those shown in the face of the plate M by means of which any number of horizontal and vertical deviations from the focal point may be observed and the mean obtained.

The graduated semicircle P, that is attached to the under side of the hour circle G, is the latitude arch; its divisions being read off by means of the fixed graduated segment Q. The upper circle G, and the parts appended to it, turn accurately on pivots U, in the standard C, which pivots are the centers of the latitude arch P.

R is the gnomon, consisting of a semicircular wire or narrow strip of metal which is made fast to the arbor of the hour hand of a chronometer, the face of which chronometer is shown at S, and is represented as divided into twice twelve hours; around this there is another circle T that is also divided into twice twelve hours, and into minutes; the circles G and T, receive the shadow of the gnomon, and on them are read off its indications. The respective parts thus combined and arranged constitute all the which are essential in the construction and operation of this instrument. The tightening screws that are necessary to hold the parts in place when adjusted are the same as in other instruments of a like character.

In using this instrument when on a voyage, the intended course of the vessel being known, the first adjustment is to set the nonius index D to said course on the graduated plate A. The plate M is then set to the declination by means of the declination arch J. The next operation to place the instrument in a proper position for allowing the sun's rays to fall on the lens O; and on the inner edge of the destination arch, and the circle G is then to be elevated or depressed, as the case may be, until the focal point is made to fall correctly on the plate M; the arch P, will then indicate the latitude.

The chronometer indicates mean time and as the gnomon is affixed to the hour hand which performs one revolution in twenty-four hours, the gnomon will preserve its relative situation as respects the sun undeviatingly. The shadow of the gnomon will consequently give the means of ascertaining the true time when thrown on the degree due to the declination. It will be manifest therefore, that all the elements necessary for ascertaining the longitude and latitude at any time, are fully given.

The apparatus as herein represented and described is not furnished with a compass needle; this not being necessary to its operation, but it may be advantageously combined with the mariner's or surveyor's compass if desired.

The instrument so constructed will serve to solve practically all the problems that can be solved by the armillary sphere, or by spherical trigonometry so far as circles and their motions are concerned. As, for example, having the declination and the time given it will show the altitude and latitude, or having the declination and the meridian given it will give both the time and the latitude at any hour and at any place.

Having thus fully described the manner in which I construct my mariners' time compass and also the means of practically using the same, what I claim therein as new and desire to secure by Letters Patent is—

The manner herein set forth of combining a chronometer, and an universal sun dial with the respective circles and arcs of circles containing the graduations for the course, or points of the compass, the hours, the latitude and altitude. The respective parts being arranged and operating substantially in the manner, and for the purpose, herein fully made known; and this I claim whether the said parts be formed precisely in the manner herein described and represented, or in any other that is the same in its principles and results.

RALPH REEDER.

Witnesses:
ANDREW McMICKEN,
N. B. RIARDEN.